June 17, 1941.     H. R. WEST     2,246,118
SUPPLY SYSTEM FOR ELECTRICAL REGULATORS
Filed Sept. 7, 1938
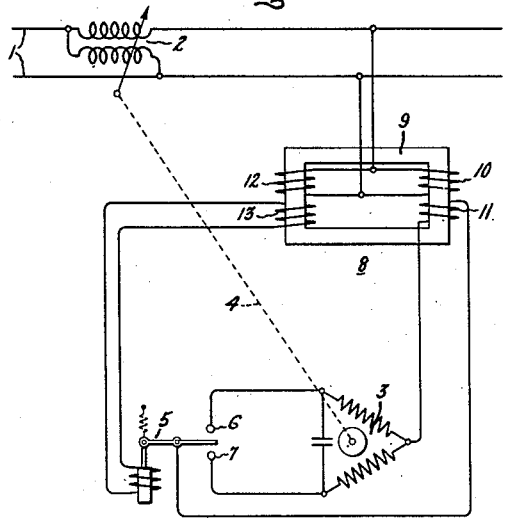
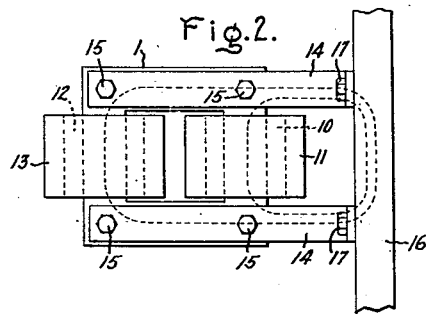
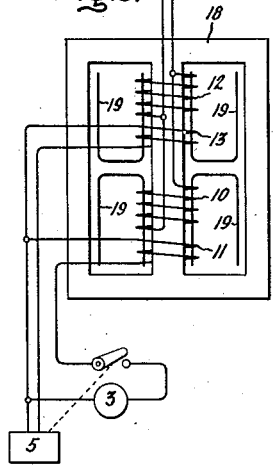
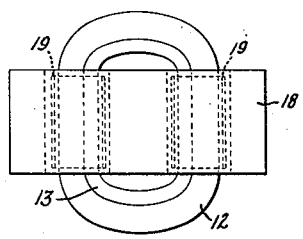
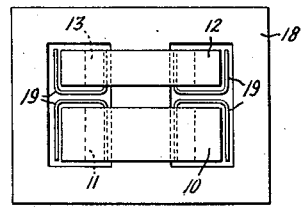
Inventor:
Harry R. West,
by Harry E. Dunham
His Attorney.

Patented June 17, 1941

2,246,118

UNITED STATES PATENT OFFICE 2,246,118

SUPPLY SYSTEM FOR ELECTRICAL REGULATORS

Harry R. West, Pittsfield, Mass., assignor to General Electric Company, a corporation of New York Application September 7, 1938, Serial No. 228,764

7 Claims. (Cl. 171—119)

This invention relates to supply systems for electrical regulators and more particularly to an improved potential transformer arrangement for energizing both the regulating relay and the operating motor of an automatic motor-operated voltage regulator.

Practically all automatic electrical regulators have a primary electroresponsive device or regulating relay and many such regulators are motor operated. In the case of voltage regulators the main regulated voltage is often too high to be conveniently applied directly to the relay or to the motor. In the past there have been used auxiliary supply transformers which supply both the regulating relay and the motor from the same secondary winding. This required transformers of relatively large size in order to limit the impedance drop, caused by the motor current, to a small enough value so that it could satisfactorily be neutralized by a voltage stabilizer of reasonable cost. An example of such an arrangement is shown in my Patent No. 1,921,713.

In accordance with the present invention a four-winding transformer having two sets of primary and secondary coils is employed. One set supplies the regulating relay or contact making voltmeter and the other set supplies the motor, indicating lamps, etc. The leakage reactance between the two sets of windings is made large with respect to the resistance and leakage reactance between the primary and secondary of each set. In this way the amount of current which will be reflected in the primary of the set supplying the regulating relay from the secondary of the set supplying the motor will be negligible so that the motor load will have negligible effect on the performance of the regulating relay. Practically the only effect which the motor can have on the voltage supplied to the regulating relay circuit is through the impedance drop in the primary circuit of the set supplying the regulating relay.

This four-winding transformer can be made considerably smaller than conventional auxiliary supply transformers of the type employed in the previously described system of my above referred to patent, thus resulting in a considerable reduction in cost, and no stabilizer will be required. The performance will be practically the same as would be obtained with two separate transformers, one to supply the regulating relay and the other to supply the motor, but the cost will be reduced, the space required will be less and wiring will be simplified.

While the invention may be used in automatic motor-operated electrical regulators generally, I find that it is particularly well adapted for use with air-cooled induction voltage regulators, either single-phase or polyphase, as well as with three-phase induction voltage regulators, whether oil-immersed or air-cooled.

An object of the invention is to provide a new and improved transformer system.

Another object of the invention is to provide a new and improved auxiliary supply system for motor-operated automatic electrical regulators.

A further object of the invention is to provide a new and improved combined potential and supply transformer arrangement for energizing the regulating relay and the operating motor of automatic power circuit voltage regulators.

The invention will be better understood from the following description taken in connection with the accompanying drawing and its scope will be pointed out in the appended claims.

In the drawing, Fig. 1 illustrates diagrammatically an embodiment of my invention in which the combined potential and supply transformer for the regulating relay and operating motor of an automatic induction voltage regulator system is provided with four windings on a core type core, Fig. 2 is a modified transformer construction for increasing the leakage reactance between the two sets of transformer windings, Fig. 3 is a diagrammatic illustration of another embodiment of the invention in which the sets of windings are mounted on a shell type core and are separated by channel shaped magnetic shunts, Fig. 4 is a plan view of a transformer constructed in accordance with Fig. 3, and Fig. 5 is a side elevation of the same.

Referring now to the drawing and more particularly to Fig. 1, there is shown therein a main circuit 1 whose voltage is to be regulated. The voltage regulating means is shown by way of example as a conventional induction voltage regulator 2, such as is often employed for regulating the voltage of alternating current feeder circuits in power systems. For operating the regulator there is provided a conventional reversible operating motor 3 which is connected to drive the regulator by any suitable and well-known driving means, shown schematically by the dotted line 4. The direction of operation of the motor 3 in response to the voltage of circuit 1 is controlled by a voltage regulating relay 5 in the form of a contact making voltmeter having a set of raise contacts 6 which complete a circuit for causing the motor 3 to drive the regulator in a direction to raise the voltage and a set of lower contacts 7 for controlling the operation of the motor in the opposite direction. When the circuit voltage is normal the relay is in its illustrated position in which both sets of contacts are open and the operation of the relay is such that if the voltage falls slightly below normal the raise contacts 6 close and if the voltage rises slightly above normal the lower contacts 7 close.

Both the motor 3 and the relay 5 are energized from the main circuit 1 through a special transformer 8. This transformer has a two-legged magnetic core 9, on one leg of which is placed a set of windings comprising a primary winding 10 and a secondary winding 11 connected to supply operating current for the motor 3. These windings are relatively closely coupled. On the other leg of the core is placed a second set of windings comprising a primary winding 12 and a secondary winding 13 connected to energize the relay 5. The windings 12 and 13 are relatively closely coupled. The two primary windings 10 and 12 are connected to be energized in response to the voltage of circuit 1, preferably by connecting them in parallel with each other across the circuit 1.

The leakage reactance between the set of windings 10 and 11 on the one hand and the set of windings 12 and 13 on the other hand is relatively very large by reason of their being wound on opposite legs of the core. The result is that the motor current flowing in the secondary winding 11 will have substantially no effect on the voltage of the secondary winding 13, so that although both the motor and the primary relay are energized by the same transformer the energization of the primary relay will always be substantially truly responsive to the voltage of circuit 1 regardless of the operation of the motor 3.

The operation of Fig. 1 is such that in response to any voltage disturbance on the circuit 1 the regulating system always acts to bring the voltage relay 5 back to its balanced mid-position and as this position corresponds to a definite voltage of circuit 1 the entire regulating system automatically acts to maintain the voltage of circuit 1 at a predetermined value or at least within predetermined close limits.

In Fig. 2 the leakage between the two sets of windings is enormously increased by means of a steel, or other suitable magnetic, mounting structure. As shown, this structure comprises steel strips 14 bolted to the sides of the core 1 at the top and bottom thereof by means of bolts 15. These strips have extensions which are fastened to a magnetic frame or support 16 by means of bolts 17. The extensions of the strips 14 and the portion of the support 16 therebetween forms, in effect, a relatively low reluctance magnetic shunt path for the leakage fluxes, shown by the dotted lines, of the two sets of windings.

In Fig. 3 the set of windings 12 and 13 is mounted on the upper part of the center leg of a shell type core 18 and the set of windings 10 and 11 is mounted on the lower part of this portion of the core 18. In order to increase still further the leakage reactance caused by the physical separation of the two sets of windings they are further separated magnetically by channel shaped magnetic shunts 19. The horizontal portions of these shunts, as viewed in the drawing, are the really active portions thereof which divert the flux of each set of windings from the other set. The purpose of the vertical parts of the channel shaped shunts is to reduce to a minimum the reluctance between the shunts and the core legs which might result from a loose fit if straight (horizontal) shunts were used.

Figs. 4 and 5 illustrate the physical proportions of a transformer of the type shown diagrammatically in Fig. 3. It is to be noted that the primary windings surround the secondary windings, whereas the opposite relationship is indicated in Fig. 2.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In a regulator system, a regulating relay, an operating motor whose operation is controlled by said regulating relay, and a transformer for energizing said relay and said motor, said transformer having a unitary core provided with two sets of windings each of which contains a primary winding and a different secondary winding, one secondary winding being connected to said relay and the other secondary winding being connected to supply operating current for said motor.

2. A transformer comprising in combination, a two-legged core, separate pairs of windings on each of the two legs of said core, brackets of magnetic material fastened to said core and extending beyond said core at one side thereof, a magnetic supporting member, and means for fastening said brackets to said supporting member so as to provide a low reluctance magnetic leakage path for each pair of windings.

3. A transformer comprising in combination, a shell-type core, a set of superposed relatively closely coupled primary and secondary windings wound on one portion of the center leg of said core, and a second set of superposed relatively closely coupled primary and secondary windings wound exclusively on another portion of the center leg of said core.

4. A transformer comprising in combination, a shell-type core, a set of relatively closely coupled primary and secondary windings wound on one portion of the center leg of said core, a second set of relatively closely coupled primary and secondary windings wound on another portion of the center leg of said core, and magnetic shunts for diverting the leakage flux of each set of windings from the other set of windings.

5. A transformer comprising in combination, a shell-type core, a pair of primary and secondary windings wound one on top of the other over a portion of the center leg of said core, a second set of primary and secondary windings wound one on top of the other over another portion of the center leg of said core, and channel-shaped magnetic shunts having their cross pieces between said sets of windings and having their side pieces extending respectively along the inner and outer surfaces of said sets of windings.

6. In a regulator system, a regulating relay, an operating motor whose operation is controlled by said regulating relay, and a transformer for energizing said relay and said motor, said transformer having a unitary core provided with two sets of windings each of which contains a primary winding and a separate secondary winding, the coupling between the windings of each set being relatively close with respect to the coupling between said secondary windings, one secondary winding being connected to said relay and the other secondary winding being connected to supply operating current for said motor.

7. In a regulator system, a regulating relay, an operating motor whose operation is controlled by said regulating relay, a transformer for energizing said relay and said motor, said transformer having a unitary core provided with two sets of windings each of which contains a primary winding and a separate secondary winding, one secondary winding being connected to said relay and the other secondary winding being connected to supply operating current for said motor, and means for making the coupling between the secondary windings negligible with respect to the coupling between the windings of each set.

HARRY R. WEST.